United States Patent
Sakurai

(10) Patent No.: US 9,354,708 B2
(45) Date of Patent: May 31, 2016

(54) INFORMATION DISPLAY DEVICE, INFORMATION DISPLAY METHOD, AND STORAGE MEDIUM

(71) Applicant: CASIO COMPUTER CO., LTD., Shibuya-ku, Tokyo (JP)

(72) Inventor: Keiichi Sakurai, Tokyo (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 59 days.

(21) Appl. No.: 14/191,107

(22) Filed: Feb. 26, 2014

(65) Prior Publication Data
US 2014/0285423 A1    Sep. 25, 2014

(30) Foreign Application Priority Data
Mar. 19, 2013   (JP) ................................ 2013-056942

(51) Int. Cl.
*G06F 3/01*   (2006.01)
*G06F 1/16*   (2006.01)

(52) U.S. Cl.
CPC ................ *G06F 3/017* (2013.01); *G06F 1/163* (2013.01); *G06F 3/014* (2013.01)

(58) Field of Classification Search
CPC .......... G06F 3/017; G06F 3/014; G06F 1/163
See application file for complete search history.

(56) References Cited

U.S. PATENT DOCUMENTS

| | | | |
|---|---|---|---|
| 2011/0279373 A1 | 11/2011 | Yokoyama et al. | |
| 2011/0298700 A1 | 12/2011 | Ito et al. | |
| 2014/0139433 A1* | 5/2014 | Choi et al. | 345/158 |

FOREIGN PATENT DOCUMENTS

| | | |
|---|---|---|
| JP | 07175583 A | 7/1995 |
| JP | 08014911 A | 1/1996 |
| JP | 2011-242832 A | 12/2011 |
| JP | 2011-253493 A | 12/2011 |
| JP | 2011248811 A | 12/2011 |
| JP | 2012239776 A | 12/2012 |

OTHER PUBLICATIONS

Japanese Office Action (and English translation thereof) dated Apr. 28, 2015, issued in counterpart Japanese Application No. 2013-056942.

* cited by examiner

*Primary Examiner* — Dennis Joseph
(74) *Attorney, Agent, or Firm* — Holtz, Holtz & Volek PC

(57) ABSTRACT

While an information display device is initially placed at a standstill, a CPU stores acceleration responsive to gravitational force acquired by an acceleration sensor into a RAM. The CPU acquires acceleration in compliance with fixed timing acquired by the acceleration sensor and resulting from motion on the information display device. The CPU accumulates the acceleration acquired in compliance with the fixed timing within each prescribed period. Then, the CPU makes the accumulated acceleration agree with acceleration responsive to gravitational force stored in the RAM, thereby correcting a posture parameter. Based on the corrected posture parameter, the CPU determines whether a temporal image is to be displayed on a display unit.

9 Claims, 7 Drawing Sheets

INFORMATION DISPLAY DEVICE, INFORMATION DISPLAY METHOD, AND STORAGE MEDIUM

This application is based upon and claims the benefit of priority from the prior Japanese Patent Application No. 2013-056942, filed Mar. 19, 2013, and the entire contents of which are incorporated herein by reference.

BACKGROUND OF THE INVENTION

1. Field of the Invention

This invention relates to an information display device, an information display method, and a storage medium.

2. Related Art

According to a conventional information display device to be attached to a wrist, in order to determine the visual recognition by a person wearing the information display device, for example, what has been important is to detect the motion by the person of seeing time on a wristwatch, specifically a gesture of placing a time indicator in a substantially upward position while raising an arm with a bent elbow. Regarding detection of a gesture, there has been a method suggested for example in patent literature 1. This method detects the rotary motion of a device using an acceleration sensor.

However, the method of Japanese Patent Application Laid-Open No. 2011-242832 detects a gesture only with an acceleration sensor, so that it failed to achieve a sufficient degree of detection accuracy. Meanwhile, as suggested for example in Japanese Patent Application Laid-Open No. 2011-253493, there has been a method of detecting the posture of a device using an angular velocity sensor in addition to an acceleration sensor. This method can increase a degree of accuracy in detecting a gesture.

Meanwhile, a human being makes many similar motions. Hence, the method of detecting the posture of a device using an angular velocity sensor in addition to an acceleration sensor has still failed to achieve a sufficient degree of detection accuracy.

SUMMARY OF THE INVENTION

This invention has been made in view of the aforementioned circumstances. It is an object of this invention to increase a degree of accuracy in detecting a gesture at an information display device to be attached to a wrist.

In order to achieve this object, an information display device according to one aspect of this invention comprises:

a display unit on which certain information is displayed;

a case including the display unit;

an acceleration sensor to detect acceleration generated in a direction of each of three axes of the case orthogonal to each other;

an angular velocity sensor to detect angular velocity determined relative to each of the orthogonal three axes;

a first acquiring unit to acquire the acceleration detected by the acceleration sensor and the angular velocity detected by the angular velocity sensor;

a first storage control unit to store a posture parameter into a memory while the case is at a standstill, the posture parameter being determined in this standstill condition and including acceleration responsive to gravitational force detected by the acceleration sensor;

an updating unit to update the posture parameter stored in the memory each time the angular velocity is detected, the posture parameter being updated in response to a value of the acquired angular velocity;

a calculating unit to calculate acceleration responsive to gravitational force from the detected acceleration based on the updated posture parameter;

a first accumulating unit to accumulate the calculated acceleration;

a first correcting unit to correct the posture parameter such that the accumulated acceleration accumulated by the first accumulating unit agrees with the acceleration responsive to gravitational force stored in the memory; and a display control unit to determine whether the certain information is to be displayed on the display unit based on the posture parameter corrected by the first correcting unit.

DETAILED DESCRIPTION OF THE INVENTION

Figure 1:
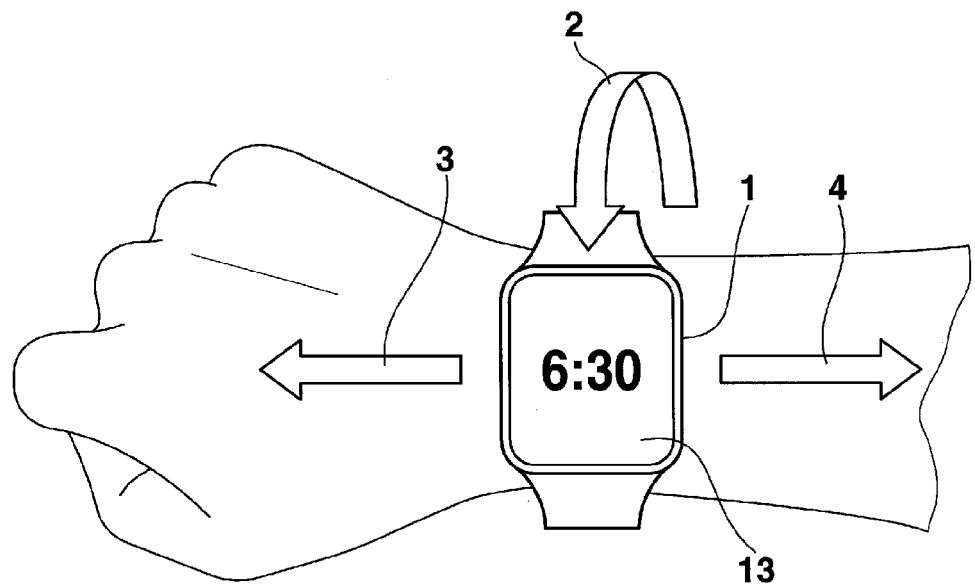
FIG. 1 is a view indicating an outline of an embodiment of an information display device of this invention.

An embodiment of this invention is described below by referring to the drawings.

The embodiment of this invention is described below by referring to the accompanying drawings.

Figure 2:
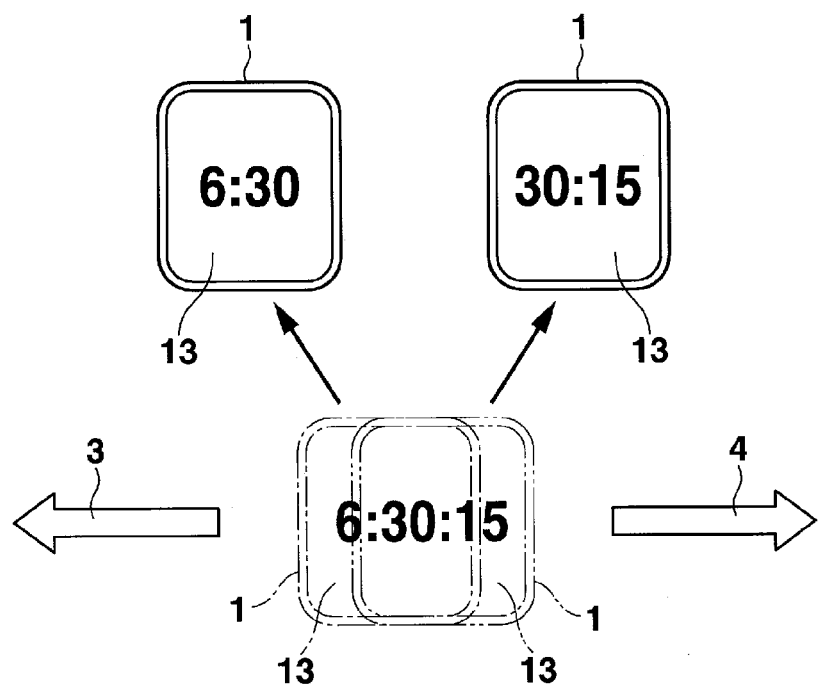
FIG. 2 is a view indicating an outline of the embodiment of the information display device of this invention.

FIGS. 1 and 2 are views indicative of an outline of an information display device 1 of an embodiment of this invention.

In this embodiment, the information display device 1 is a wristwatch to be attached to a wrist of a user. As shown by arrow 2, in response to a user's gesture of placing a liquid crystal display unit 13 (described later) of the information display device 1 in a substantially vertical direction while raising an arm with a bent elbow, the information display device 1 detects this gesture, and displays a temporal image as information indicating time on the liquid crystal display unit 13. The vertical direction mentioned herein is a direction vertical to the plane of the paper of FIG. 1 while penetrating the plane from a back side toward a front side.

The information display device 1 of this embodiment detects angular velocity generated in the device. Time-series data about the detected angular velocity is compared with time-series data about angular velocity indicating a gesture pattern of motion of seeing time on the wristwatch, thereby detecting a gesture based on similarity therebetween.

This can increase a degree of accuracy in detecting a gesture at the information display device 1.

If a user moves the information display device 1 in the direction of arrow 3, the information display device 1 detects the movement. In cooperation with the movement of the information display device 1 caused by the user, a temporal image "6:30:15" displayed on the liquid crystal display unit 13 slides in a direction opposite to the direction of arrow 3 to become "6:30." If the user moves the information display device 1 in the direction of arrow 4, the information display device 1 similarly detects the movement. In cooperation with this movement, the temporal image "6:30:15" displayed on the liquid crystal display unit 13 slides in a direction opposite to the direction of arrow 4 to become "30:15."

Specifically, as shown in FIG. 2, if the information display device 1 moves in the direction of arrow 3 or 4, a part of the temporal image "6:30:15" to be displayed on the liquid crystal display unit 13 appears depending on the amount and the direction of the movement.

The information display device 1 does not always move in the direction of arrow 3 or 4. Display can slide in cooperation with the movement in any direction within 360 degrees.

Thus, in response to movement of the information display device 1 caused by the user, information can be displayed on a screen virtually formed larger than a display screen mounted on the information display device 1.

[Structure of Information Display Device 1]

Figure 3:
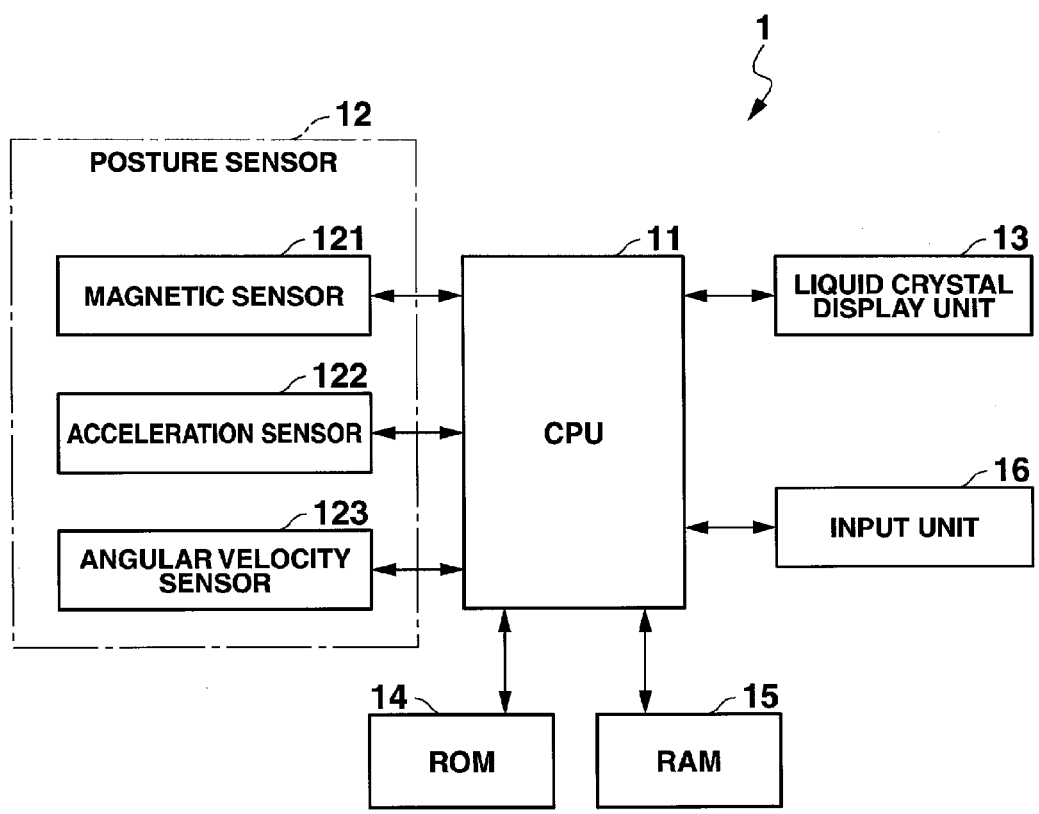
FIG. 3 is a block diagram indicating the structure of the information display device of this invention.

FIG. 3 is a block diagram indicative of the structure of the information display device 1. As shown in FIG. 3, the information display device 1 is composed of a CPU (central processing unit) 11, a posture sensor 12, the liquid crystal display unit 13, a ROM (read only memory) 14, a RAM (random access memory) 15, and an input unit 16.

The posture sensor 12 is composed of a triaxial magnetic sensor 121 to measure a direction of the Earth magnetism, a triaxial acceleration sensor 122 to measure acceleration applied to the information display device 1, and a triaxial angular velocity sensor 123 to measure rotary motion of the information display device 1. Each sensor is capable of making measurement in the directions of three axes: an x axis, a y axis, and a z axis.

Figure 4:
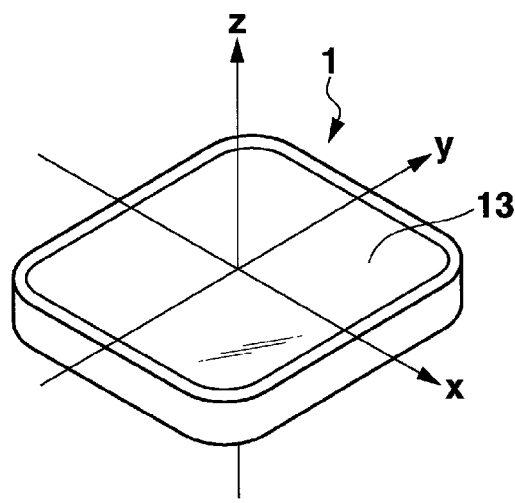
FIG. 4 is a view indicating the information display device of this invention in detail.

By referring to FIG. 4, in this embodiment, an axis in a plane where a display surface of the liquid crystal display unit 13 of the information display device 1 exists is called the y-axis, an axis orthogonal to the y-axis in the plane of the display surface is called the x-axis, and an axis orthogonal to the x-axis and the y-axis is called the z-axis. The magnetic sensor 121 can acquire respective Earth magnetism values of an x-axis component, a y-axis component, and a z-axis component. The acceleration sensor 122 can acquire respective acceleration values of an x-axis component, a y-axis component, and a z-axis component. The angular velocity sensor 123 can acquire respective values ($\omega x$, $\omega y$, $\omega z$) of angular velocity components determined relative to the axes.

A user makes motion of moving an arm or a wrist while the information display device 1 is attached to the wrist of the user, thereby making rotary motion or parallel motion of the information display device 1. The posture sensor 12 detects a magnetic sensor value, an acceleration sensor value, and an angular velocity sensor value obtained as a result of these motions, and transmits the detected values to the CPU 11.

Referring back to FIG. 3, the CPU 11 reads the acceleration value, the angular velocity value, and the direction and intensity of the Earth magnetism detected by the posture sensor 12. Then, the CPU 11 detects the posture and the amount of movement of the information display device 1 in response to these values. As a result, the CPU 11 determines whether a temporal image is to be displayed on the liquid crystal display unit 13 and determines a range of the temporal image to be displayed (range of extraction).

The liquid crystal display unit 13 displays a part of the temporal image extracted by the CPU 11. The ROM 14 stores processing programs relating to various processes to be executed by the CPU 11, specifically the aforementioned processes of acquiring sensor values with the posture sensor 12 and extracting the temporal image. The RAM 15 stores each sensor value obtained by the posture sensor 12 and values acquired or generated as a result of the various processes. The input unit 16 has various switches (not shown in the drawings) to accept various commanding entries by a user.

[Explanation of Coordinate System]

Figure 5:
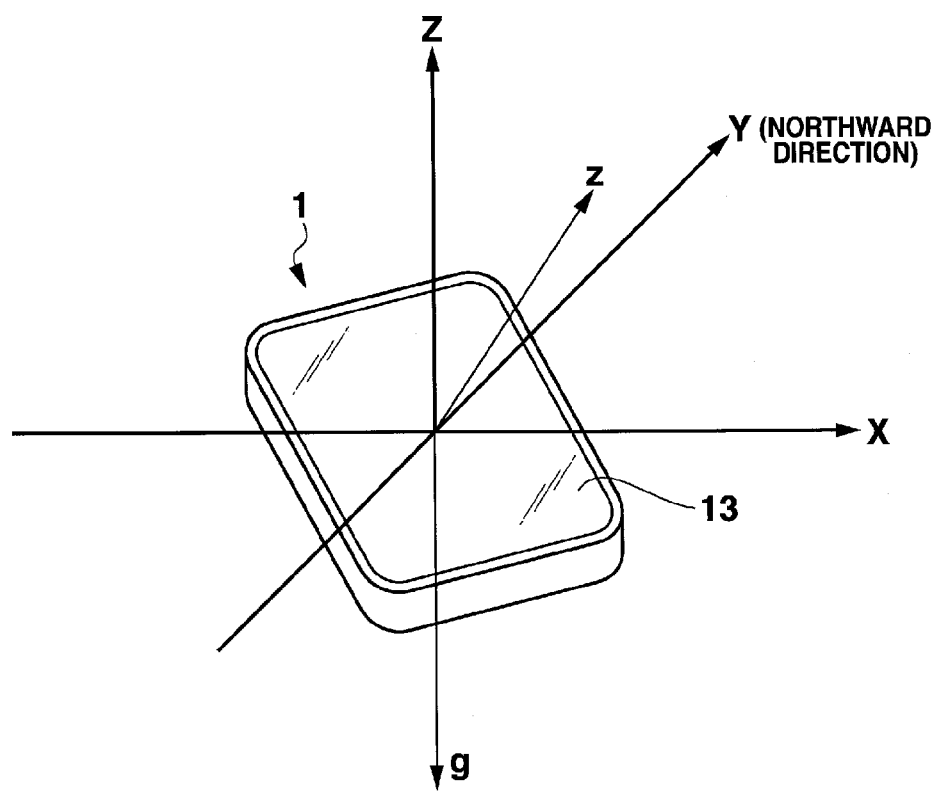
FIG. 5 is a view indicating a world coordinate system according to the embodiment of the information display device of this invention.

Next, the posture of the information display device 1 and a world coordinate system of this embodiment are described by referring to FIG. 5. The world coordinate system mentioned herein is a coordinate system that defines, irrespective of the position or orientation of the information display device 1, an eastward direction in a horizontal plane as an X-axis, a northward direction in the horizontal plane as a Y-axis, and an upward vertical direction relative to the horizontal plane as a Z-axis. Accordingly, the axes in the world coordinate system differ from the three axes of the information display device 1 shown in FIG. 4 including the x-axis, the y-axis, and the z-axis. FIG. 5 only shows the z-axis indicative of a direction normal to the display surface of the liquid crystal display unit 13.

In this embodiment, the three axes of the information display device 1 are called a local coordinate system and are represented by small letters, whereas the three axes of the world coordinate system are represented by capital letters. If a user moves the information display device 1, a relationship between the local coordinate system and the world coordinate system changes with time. The orientation of the information display device 1 in the local coordinate system as viewed from the world coordinate system is called the posture of the information display device 1.

When the information display device 1 moves, the origin of the local coordinate system as viewed from the origin of the world coordinate system also moves. The origin of the local coordinate system as viewed from the world coordinate system is called the position of the information display device 1.

[Process by Information Display Device 1]

Next, the information display process of this embodiment is described. First, the information display process performed by the information display device 1 is explained in outline by referring to FIG. 6.

Figure 6:
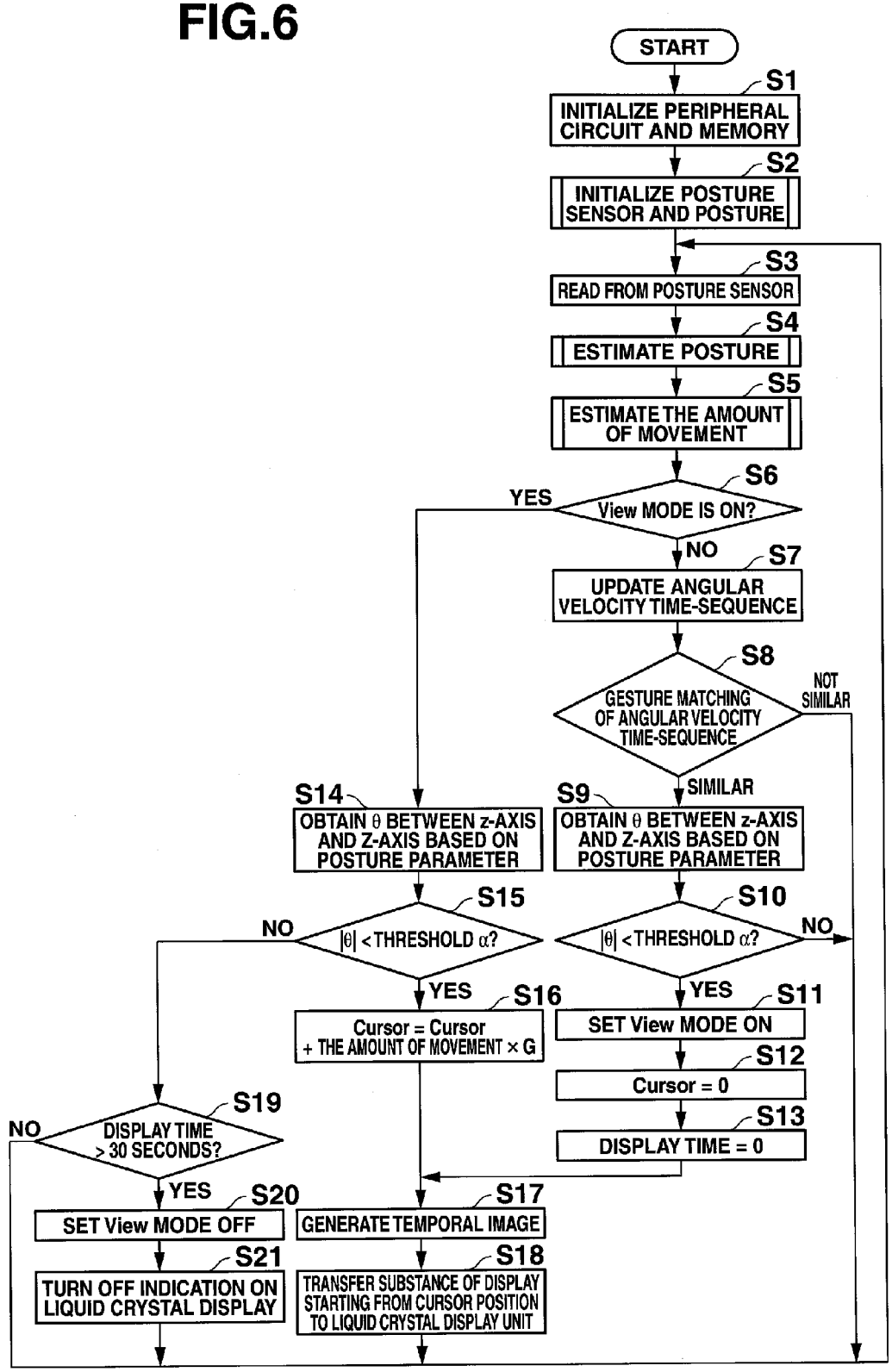
FIG. 6 is a flowchart indicating a flow of information display process performed by a CPU of the information display device of this invention.

FIG. 6 is a flowchart indicative of a flow of the information display process performed by the CPU 11 of the information display device 1. The CPU 11 reads a program code relating to the information display process from the ROM 14 and executes the program code. Steps S3 to S21 of the information display process are executed by the CPU 11 at regular intervals (at intervals of 20 milliseconds, for example).

First, the CPU 11 performs initialization including initialization of the various sensors of the posture sensor 12 and clear of data in the RAM 15 (step S1), for example. After the initialization is finished, the CPU 11 adjusts an offset, a gain and the like to change with variation of the device perceived by the various sensors of the posture sensor 12 or to change with temperature (step S2). Step S2 is described in detail below by referring to FIG. 7.

Next, the CPU 11 reads an acceleration value, an angular velocity value, and a direction and intensity of the Earth magnetism from the posture sensor 12, and stores these values into the RAM 15 (step S3).

The CPU 11 estimates the posture of the information display device 1 in response to the acceleration value, the angular velocity value, and the direction and intensity of the Earth magnetism stored in the RAM 15 (step S4). Then, the CPU 11 estimates the amount of parallel movement of the information display device 1 (step S5). Estimation of a posture is described below by referring to FIG. 8. Estimation of the amount of movement is described below by referring to FIG. 9.

Next, the CPU 11 checks to see if a View mode has been set ON (step S6). The View mode is status information indicating whether part of a temporal image is displayed and is stored in the RAM 15. In an initial status, the View mode is set OFF. Accordingly, when the process is performed for the first time, the CPU 11 determines that a result is NO in step S6 and shifts the process to step S7. A result of the determination made by the CPU 11 in step S6 continues to be NO until the View mode is set ON in step S11 to be described later.

Next, the CPU 11 stores the angular velocity value stored in the RAM 15 in step S3 into a certain region (time-series angular velocity data region) of the RAM 15 as time-series angular velocity data (step S7). Accordingly, each time step S7 is executed, an angular velocity value obtained at the time of execution of step S7 is stored in a time-series manner into the time-series angular velocity data region.

Next, the CPU 11 determines whether the time-series angular velocity data stored in step S7 is similar to time-series data about angular velocity stored in advance in the ROM 14 indicating a gesture pattern of motion of seeing time on the wristwatch (step S8). This gesture pattern includes multiple patterns. The time-series angular velocity data is stored in corresponding relationship with each of the patterns. The aforementioned data segments are determined to be similar or not by calculating similarity using a method such as a normalized correlation method. These data segments are determined to be similar or not based on the calculated similarity. If the aforementioned data segments are determined not to be similar, the CPU 11 restarts the process from step S3.

If the aforementioned data segments are determined to be similar, the CPU 11 obtains an angle θ between a direction (z-axis (see FIG. 5)) normal to the display surface of the liquid crystal display unit 13 of the information display device 1 and the upward vertical direction (Z-axis (see FIG. 5)) in the world coordinate system (step S9) based on a posture parameter (to be described later) estimated in step S4.

Next, the CPU 11 determines whether the angle θ is smaller than a predetermined threshold α (step S10). If determining that the angle θ is the same as or larger than the threshold α, the CPU 11 determines that the direction (z-axis (see FIG. 5)) normal to the display surface of the liquid crystal display unit 13 does not point to the substantially upward vertical direction. Specifically, the CPU 11 determines that motion of seeing time on the wristwatch was not made. Accordingly, the CPU 11 restarts the process from step S3. If the CPU 11 determines that the angle θ is smaller than the threshold α, the liquid crystal display unit 13 points to the substantially upward vertical direction relative to the horizontal plane. In this case, the CPU 11 determines that motion of seeing time on the wristwatch was made, and shifts the process to step S11.

Next, the CPU 11 sets the View mode ON (step S11). Further, the CPU 11 initializes a variable Cursor indicative of a cursor position to zero indicating the left end of a display position on the liquid crystal display unit 13 (step S12). Then, the CPU 11 initializes a counter to measure a display time to zero (step S13). A circuit structure of the counter to measure a display time is such that the display time is updated automatically.

Next, the CPU 11 generates a temporal image to be displayed on the liquid crystal display unit 13 (step S17). As an example to be displayed, the CPU 11 reads current temporal information from an RTC (real time clock) circuit (not shown in the drawings) provided inside the CPU 11, and generates the temporal image shown in FIG. 2 containing digital numbers "6:30:15."

Then, regarding a position currently indicated by the variable Cursor as a starting point, the CPU 11 extracts a region covering a range to be displayed on the liquid crystal display unit 13 from the temporal image "6:30:15," and transfers display data about the extracted region to the liquid crystal display unit 13 (step S18). After step S18 is finished, the CPU 11 restarts the process from step S3.

Once the View mode is set ON and then the process is performed from step S3, the CPU 11 determines that a result of step S6 is YES and shifts the process to step S14.

The CPU 11 obtains the angle θ between the direction (z-axis (see FIG. 5)) normal to the display surface of the liquid crystal display unit 13 of the information display device 1 and the upward vertical direction (Z-axis (see FIG. 5)) in the world coordinate system (step S14) based on the posture parameter estimated in step S4.

Next, the CPU 11 determines whether the angle θ is smaller than the predetermined threshold α (step S15). If the CPU 11 determines that the angle θ is smaller than the threshold α, the liquid crystal display unit 13 continues to point to the substantially upward vertical direction relative to the horizontal plane. In this case, the CPU 11 determines that time on the wristwatch continues to be seen, and shifts the process to step S16.

The CPU 11 adds a value obtained by multiplying the amount of movement of the information display device 1 estimated in step S5 by a constant G to the variable Cursor, thereby updating the variable Cursor (step S16). The constant G is a ratio used to obtain the amount of movement of the temporal image "6:30:15" when this image is caused to slide and is displayed on the liquid crystal display unit 13 based on the amount of movement of the information display device 1.

Next, as described above, the CPU 11 generates a temporal image to be displayed on the liquid crystal display unit 13 (step S17).

Then, regarding a position currently indicated by the variable Cursor as a starting point, the CPU 11 extracts a covering range to be displayed on the liquid crystal display unit 13 from the temporal image "6:30:15," and transfers the display data about the extracted region to the liquid crystal display unit 13 (step S18). After step S18 is finished, the CPU 11 restarts the process from step S3.

If it is determined that the angle θ is the same as or larger than the predetermined threshold α, the CPU 11 determines that the direction (z-axis (see FIG. 5)) normal to the display surface of the liquid crystal display unit 13 is not directed in the substantially upward vertical direction. Specifically, the CPU 11 determines that the user has finished seeing the watch and lowered an arm. Then, the CPU 11 shifts the process to step S19.

The CPU 11 refers to a value of the counter to measure a display time to determine whether a display time on the liquid crystal display unit 13 has exceeded 30 seconds (step S19). If it is determined that the display time does not exceed 30 seconds, the CPU 11 restarts the process from step S3. If it is determined that the display time has exceeded 30 seconds, the CPU 11 sets the View mode OFF (step S20) to turn off display on the liquid crystal display unit 13 (step S21). Then, the CPU 11 restarts the process from step S3.

[Initialization of Posture Sensor and Posture]

Figure 7:
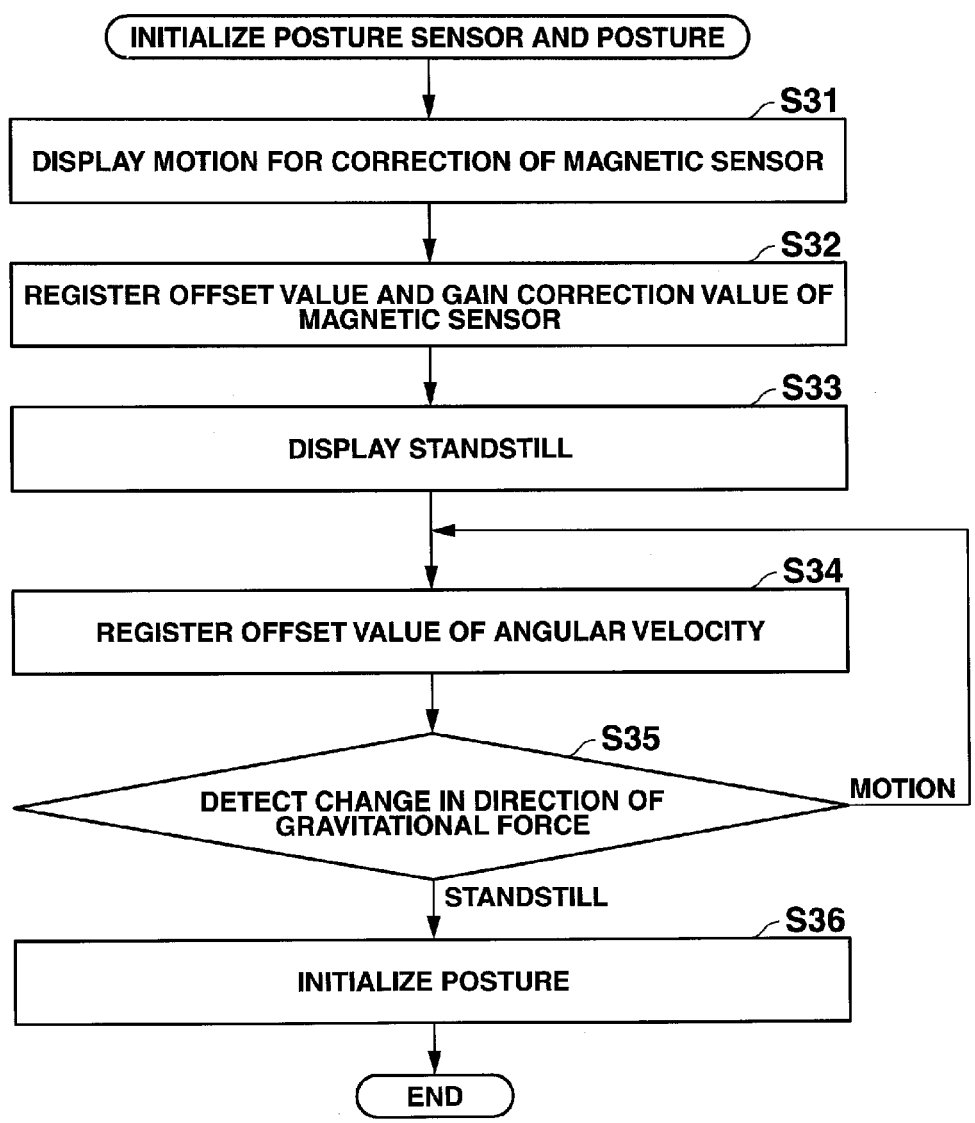
FIG. 7 is a flowchart indicative of a flow of initialization of a posture sensor and a posture.

The initialization of the posture sensor 12 and a posture in step S2 of FIG. 6 is explained in detail by referring to FIG. 7.

FIG. 7 is a flowchart indicative of a flow of the initialization of the posture sensor 12 and a posture.

First, the CPU 11 displays certain indication intended to urge the user to make motion of placing the information display device 1 in various directions (step S31). As an example of the indication, the CPU 11 displays a message on the liquid crystal display unit 13: "Please move the information display device 1 in various directions."

Further, the CPU 11 obtains correction data about an offset and a gain of the magnetic sensor 121 (step S32). More specifically, the CPU 11 measures an Earth magnetism value with the magnetic sensor 121 obtained when the user places the information display device 1 in various directions in response to step S31. Then, the CPU 11 obtains the correction data using the measured Earth magnetism value. As an exemplary way of obtaining an offset value and a gain value, the CPU 11 calculates a median of each axis of the magnetic sensor 121 based on the maximum and the minimum of this axis, and determines the calculated median as an offset value of each axis.

Further, the CPU 11 calculates a gain correction value such that the value of each axis becomes the same between the center and the maximum of this axis, and stores the calculated offset value and the gain correction value into the RAM 15. In subsequent steps, when reading a value of the magnetic sensor 121, the CPU 11 subtracts the offset value from the read value, and multiplies a resultant value by the gain correction value, thereby correcting an Earth magnetism value and determines this corrected value as a detected value.

Next, the CPU 11 displays certain indication intended to urge the user to place the information display device 1 at a standstill (step S33). As an example of the indication, the CPU 11 displays a message on the liquid crystal display unit 13: "Please place the information display device 1 at a standstill with a display surface facing up."

Next, the CPU 1 reads data about each axis of the angular velocity sensor 123. Variation of the device or temperature change generally varies an offset value of the angular velocity sensor 123 determined when angular velocity is zero. The CPU 11 stores a value of the angular velocity sensor 123 as an offset value into the RAM 15 (step S34). In subsequent steps, when reading a value of the angular velocity sensor 123, the CPU 11 subtracts this offset value from the read value, thereby making adjustment such that angular velocity determined when the information display device 1 is at a standstill becomes zero.

Next, the CPU 11 reads data about each axis of the acceleration sensor 122 and compares the read value with a previously determined acceleration, thereby determining whether change in the direction of gravitational force has been detected (step S35). More specifically, while the information display device 1 is at a standstill, a value of the acceleration sensor 122 indicates only the component of each axis acting in the direction of gravitational force. Hence, in the absence of change in value of each axis component, the CPU 11 can determine that the information display device 1 is at a standstill. In this embodiment, if a value of each axis component does not change for about one second, the CPU 11 determines that the information display device 1 is at a standstill. If determining that the information display device 1 is at a standstill, the CPU 11 completes registration of an offset value of angular velocity, and shifts the process to step S35. If detecting motion of the information display device 1, the CPU 11 shifts the process to step S34 and registers an offset value again.

Next, the CPU 11 initializes a posture (step S36). More specifically, the CPU 11 determines, as the Z-axis direction in the world coordinate system, a direction opposite to a direction in which a value of the acceleration sensor 122 is obtained. Next, a value obtained by subtracting a component in the Z-axis direction from a value detected by the magnetic sensor 121 indicates the north in the horizontal direction. The CPU 11 then determines a resultant value as the northward direction (Y-axis direction) in the world coordinate system. The X-axis direction is orthogonal to the Z axis direction and the Y axis direction, so that it can be determined automatically. In this way, a relationship between the world coordinate system and the local coordinate system is initialized. The CPU 11 stores each axis component about angular velocity, each axis component about acceleration, and each axis component about the Earth magnetism determined at the time of the initialization into the RAM 15.

A sensor value of the angular velocity sensor 123 and that of the magnetic sensor 121 can be corrected in reverse order.

[Estimation of Posture]

Figure 8:
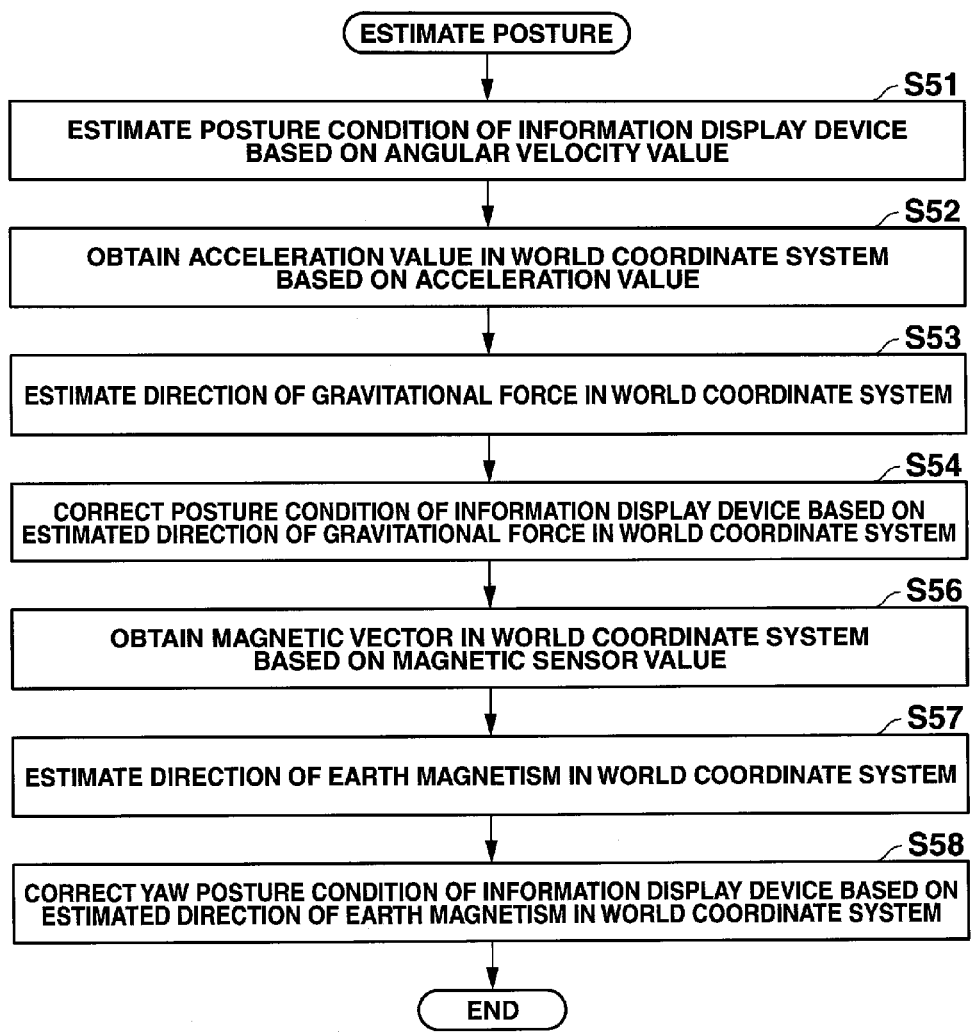
FIG. 8 is a flowchart indicative of a flow of estimation of a posture.

The estimation of a posture in step S4 of FIG. 6 is explained in detail by referring to FIG. 8.

FIG. 8 is a flowchart indicative of a flow of the estimation of a posture.

Basis vectors along the x-axis, the y-axis, and the z-axis in the local coordinate system as viewed from the world coordinate system are defined as $e_x$, $e_y$ and $e_z$ respectively. A matrix $T_{L \to W} = (e_x e_y e_z)$ including each basis vector in a column is defined. Then, the following relationships (1) and (2) are established between a point $p=(xyz)^T$ in the local coordinate system and a point $P=(XYZ)^T$ in the world coordinate system corresponding to the point p (the symbol T means a transposed matrix):

$$P = T_{L \to W} p \tag{1}$$

$$P = T_{L \to W}^T P \tag{2}$$

As seen from the above, $T_{L \to W}$ shows a relationship between the two coordinate systems. In this way, a current condition of the posture of the information display device 1 can be expressed using the relationship between the two coordinate systems, for example. The posture can be expressed by means of an angle such as a pitch angle, a yaw angle, or a roll angle.

A third-order angular velocity vector having each axis component in the local coordinate system can be acquired based on a value of the angular velocity sensor 123 currently read at time t. A rotation angle vector $\theta t = (\theta_{xt} \theta_{xy} \theta_{zt})$ can be obtained by multiplying a value of each axis component by $\delta T$ indicative of a sampling time of the angular velocity sensor 123.

The posture of the information display device 1 can be determined based on this rotation angle vector. More specifically, by using a compound matrix $R_{all}(\theta_t)$ including rotation $\theta_{xt}$ about the x-axis, rotation $\theta_{yt}$ about the y-axis, and rotation $\theta_{zt}$ about the z-axis, and a posture $T_{L \to Wt-1}$ determined last time, the posture $T_{L \to Wt}$ at the time t can be estimated as follows: $T_{L \to Wt} = R_{all}(\theta_t) \cdot T_{L \to Wt-1}$. In this way, the CPU 11 updates the posture determined last time based on the current value of the angular velocity sensor 123, thereby estimating the current posture (step S51).

However, an error is accumulated in the posture thereby determined. Once the posture is determined mistakenly, a posture is determined at a considerably reduced degree of accuracy thereafter. It is assumed for example that the y-axis of the information display device 1 has rotated from a forward horizontal position toward a rightward horizontal position. In this case, an error is first caused in the rotation in the vertical direction not in the horizontal direction. This makes the tip of the y-axis of the information display device 1 rotate along an obliquely upward path. Additional rotation is added thereafter to the posture in this condition, so that the posture deviates from its original posture at an increasing rate. Accordingly, estimation of a posture is corrected by estimating gravitational force, thereby increasing a degree of accuracy of a posture.

An acceleration vector detected by the acceleration sensor 122 is composed of each axis component in the local coordinate system. This acceleration vector is expressed in the world coordinate system using the posture information obtained in step S51.

In the absence of external force, the acceleration sensor 122 detects only gravitational force. Accordingly, in this case, converting an acceleration vector in the local coordinate system detected by the acceleration sensor 122 to an acceleration vector in the world coordinate system always places the information display device 1 in the same direction. However, external force such as centrifugal force is applied while the information display device 1 operates. Thus, the information display device 1 does not always face in the same direction. The velocity becomes zero at any moment such as when the user places the information display device 1 at a standstill to see indication thereon or when the user has lowered an arm and placed the information display device 1 at a standstill. Specifically, the integral of external force obtained by excluding a component of gravitational force from the acceleration vector becomes zero at any moment. Hence, a vector obtained by integrating an acceleration vector in the world coordinate system substantially indicates the direction of gravitational force. This feature is used in estimating the direction of gravitational force in the world coordinate system.

More specifically, the CPU 11 determines an acceleration value of each axis component currently acquired by the acceleration sensor 122 by reading at the time t as $_L A_T=(A_{xt} A_{yt} A_{zt})^T$. This is a value in the local coordinate system. Thus, the CPU 11 converts this value by calculation to a value in the world coordinate system based on the formula (3) (step S52).

$$_W A_T = T_{L \to Wt} \cdot _L A_T \quad (3)$$

Next, for each component of a value of the acceleration vector converted in the world coordinate system, the CPU 11 calculates an average of those from current time to predetermined time to obtain an average acceleration vector. The predetermined period is determined experimentally according to the operating condition of the information display device 1 responsive to motion by the user, for example. The CPU 11 estimates this average acceleration vector to be a vector in the direction of gravitational force $_W e_{gt}$ (step S53).

More specifically, the CPU 11 defines the following formula (formula (4)), and makes accumulation by recursive addition. A coefficient $k_g$ is a damping coefficient, and is determined experimentally according to the operating condition of the information display device 1 responsive to motion by the user, for example.

$$Gw_t = k_g \cdot Gw_{t-1} + wA_t \quad (4)$$

Based on $Gw_t$, the vector in the direction of gravitational force $_W e_{gt}$ in the world coordinate system is estimated as follows: $_W e_{gt} = Gw_t / |Gw_t|$.

Next, the CPU 11 corrects a posture parameter $T_{L \to Wt}$ such that the vector in the direction of gravitational force $_W e_{gt}$ becomes a vector (0 0 −1) in a negative direction along the Z-axis (step S54). More specifically, with respect to an axis orthogonal to the two vectors including the vector in the direction of gravitational force $_W e_{gt}$ and the vector (0 0 −1) in the negative direction, the CPU 11 performs operation to rotate an angle between these vectors, thereby correcting the posture parameter $T_{L \to Wt}$. This realizes correction in the direction of gravitational force, thereby increasing a degree of accuracy in estimating a posture.

The aforementioned posture correction is realized only in the direction of gravitational force, so that it does not overcome accumulation of an error of a yaw angle about the Z-axis. This embodiment suggests a method using the Earth magnetism.

The CPU 11 defines a value of an Earth magnetism vector currently read at the time t obtained by the magnetic sensor 121 as $_L M_T = (M_{xt} M_{yt} M_{zt})^T$. This is a value in the local coordinate system. Thus, the CPU 11 converts this value to a value in the world coordinate system based on the formula (5) (step S56).

$$_W M_T = T_{L \to Wt} \cdot _L M_T \quad (5)$$

Next, the CPU 11 performs smoothing by using an IIR (infinite impulse response) filter, for example. A current vector in a direction obtained as a result of the smoothing is estimated to be a current direction of the Earth magnetism $_W e_{mt}$ (step S57).

More specifically, the CPU 11 performs the smoothing by executing the following IIR filter calculation (formula (6)). A coefficient $k_m$ is a filter coefficient, and is determined experimentally according to a swinging shape, for example.

$$Mw_t = (1-k_m) \cdot Mw_{t-1} + K_m \cdot _W A_t \quad (6)$$

Based on $Mw_t$, the CPU 11 estimates the current vector in a direction of the Earth magnetism $_W e_{mt}$ as follows:

$$_W e_{mt} = Mwt / |Mw_t|.$$

Next, the CPU 11 stores a vector in a direction of the Earth magnetism $_W e_{mo} = (0, 1, 0)$ in the world coordinate system in the initial status into the RAM 15. Then, the CPU 11 obtains a rotation matrix that makes the current vector in a direction of the Earth magnetism $_W e_{mt}$ and the vector in a direction of the Earth magnetism $_W e_{mo}$ in the initial status in the world coordinate system face the same direction in the XY plane of the world coordinate system. The CPU 11 corrects the posture parameter $T_{L \to Wt}$ using the rotation matrix (step S58). This realizes correction in a direction of the Earth magnetism, thereby increasing a degree of accuracy in estimating a posture.

The aforementioned rotation matrix is described in more detail. A vector is formed by making a Z-component of each vector zero. Like in correction of gravitational force, based on the directions of two vectors, a vector is formed having a length at its center corresponding to an angle formed between the two vectors while being orthogonal to these two vectors. The aforementioned rotation matrix can be expressed by converting a compound matrix representing rotation of a value of each component.

[Estimation of Position]

Figure 9:
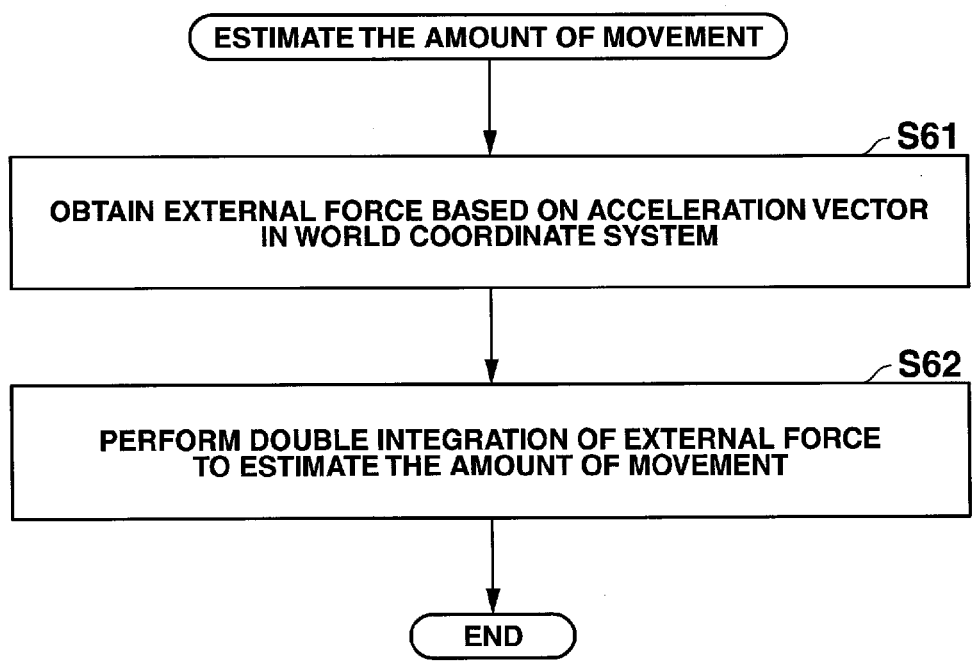
FIG. 9 is a flowchart indicative of a flow of estimation of the amount of movement.

The estimation of the amount of movement in step S5 of FIG. 6 is explained in detail by referring to FIG. 9.

FIG. 9 is a flowchart indicating the estimation of the amount of movement.

For estimating the amount of movement of the information display device 1, vector in the direction of gravitational force $_W e_{gt}$ in the world coordinate system is estimated in step S53 of FIG. 8. The CPU 11 obtains a vector by eliminating a component of the direction of gravitational force $_W e_{gt}$ from the acceleration vector in the world coordinate system, and defines the resultant vector as acceleration $_W F_T$ responsive to external force (step S61). Further, the CPU 11 integrates the acceleration $_W F_T$ responsive to external force to obtain moving velocity $_W v_t$. The CPU 11 further integrates the moving velocity $_W v_t$ to obtain the amount of movement $_W D_t$ in the horizontal plane (step S62).

The structure of the information display device 1 and the process by the information display device 1 of this embodiment are as described above.

In this embodiment, the CPU 11 acquires acceleration detected by the acceleration sensor 122 and angular velocity detected by the angular velocity sensor 123. While the information display device 1 is at a standstill, the CPU 11 stores a posture parameter into the RAM 15 that is determined in this standstill condition and including acceleration responsive to gravitational force detected by the acceleration sensor 122. Then, the CPU 11 updates the posture parameter according to the angular velocity detected by the angular velocity sensor 123. Based on the updated posture parameter, the CPU 11 calculates acceleration responsive to gravitational force from the detected acceleration. The CPU 11 accumulates the calculated acceleration. The CPU 11 corrects the posture parameter such that the accumulated acceleration agrees with the acceleration responsive to gravitational force stored in the RAM 15. Based on the corrected posture parameter, the CPU 11 determines whether a temporal image is to be displayed on the liquid crystal display unit 13.

Accordingly, the direction of gravitational force is corrected while the information display device is operated. This increases a degree of accuracy in estimating the posture of the information display device, thereby achieving a higher degree of accuracy in detecting a gesture of seeing time on a wristwatch.

In this embodiment, the CPU 11 stores acquired angular velocity in a time-series manner into the RAM 15, and calculates similarity between a time-series pattern of the stored angular velocity and predetermined multiple time-series patterns of angular velocity. Further, the CPU 11 determines based on the calculated similarity whether a temporal image is to be displayed on the liquid crystal display unit.

Gestures of actually seeing time on a wristwatch are defined in advance as multiple time-series patterns of angular velocity. Thus, a temporal image is displayed only when motion similar to a gesture of actually seeing time on the wristwatch is made on the information display device. This allows saving of wasteful power consumption.

In this embodiment, the CPU 11 calculates a moving distance of the information display device 1 based on acceleration acquired by the acceleration sensor 122. The CPU 11 determines a range of a temporal image to be displayed on the liquid crystal display unit 13 based on the calculated moving distance.

While a display region is limited, this allows displaying a part of the temporal image of a range exceeding this display region. This also allows displaying a part of this image not appearing in the display region by moving the information display device 1. Hence, in the case of a narrow display region such as in a wristwatch, character information about time can be displayed in an enlarged manner. This achieves a favorable user interface. As an example, a user is allowed to check lap elapsed time easily during a jog.

In this embodiment, while the information display device 1 is at a standstill, the CPU 11 makes the magnetic sensor 121 detect respective Earth magnetism components generated in the directions of the three orthogonal axes of the information display device 1. The CPU 11 converts the components to Earth magnetism components in the world coordinate system based on the aforementioned posture parameter, and stores the resultant components into the RAM 15. Then, the CPU 11 acquires the respective Earth magnetism components of the axes detected by the magnetic sensor 121. Based on the posture parameter, the CPU 11 converts the respective Earth magnetism components of the axes thereby acquired to Earth magnetism components in the world coordinate system. The CPU 11 accumulates the converted Earth magnetism components, and makes correction such that each of the accumulated Earth magnetism components agrees with a corresponding Earth magnetism component stored in the RAM 15.

Thus, not only the direction of gravitational force but also a direction of the Earth magnetism is corrected while the information display device 1 is operated. This increases a degree of accuracy in estimating the posture of the information display device 1, thereby achieving a higher degree of accuracy in detecting a gesture of seeing time on a wristwatch.

The embodiment of this invention described so far is only illustrative and does not limit the technical scope of this invention. Various other embodiments can be applied to this invention. Additionally, these embodiments can be changed in any way by means of omission or replacement without departing from the scope of this invention. These embodiments or modifications thereof are within the scope and the substance of the invention described in this specification, and within the invention recited in the scope of claims and within a scope equivalent to this invention.

What is claimed is:

1. An information display device, comprising:
   a display unit on which certain information is displayable;
   a case including the display unit;
   an acceleration sensor to detect an acceleration generated in a direction of each of three axes of the case, the three axes of the case being orthogonal to each other;
   an angular velocity sensor to detect an angular velocity determined relative to each of the orthogonal three axes;
   a first acquiring unit to acquire the acceleration detected by the acceleration sensor and the angular velocity detected by the angular velocity sensor;
   an angular velocity storage control unit to store angular velocities acquired by the first acquiring unit in a time-series manner;
   a first storage control unit to store a posture parameter into a memory while the case is in a standstill condition, the posture parameter being determined in the standstill condition and including an acceleration responsive to a gravitational force detected by the acceleration sensor;
   an updating unit to update the posture parameter stored in the memory each time the angular velocity is detected, the posture parameter being updated in response to a value of the acquired angular velocity;
   a calculating unit to calculate the acceleration responsive to the gravitational force from the detected acceleration based on the posture parameter updated by the updating unit in response to the value of the acquired angular velocity;
   a first accumulating unit to accumulate accelerations calculated by the calculating unit to thereby acquire an accumulated acceleration;
   a first correcting unit to correct the posture parameter such that the accumulated acceleration accumulated by the first accumulating unit coincides with the acceleration responsive to the gravitational force stored in the memory;
   a similarity calculating unit to calculate a similarity between a time-series pattern of the angular velocities stored by the angular velocity storage control unit and a predetermined time-series pattern of angular velocities; and
   a display control unit to determine whether the certain information is to be displayed on the display unit based on the posture parameter corrected by the first correcting unit and the similarity calculated by the similarity calculating unit.

2. The information display device according to claim 1, further comprising:
a moving distance calculating unit to calculate a moving distance of the case based on the acceleration detected by the acceleration sensor; and
a display range determining unit to determine a range in which the certain information is to be displayed on the display unit,
wherein the display range determining unit determines the range in which the certain information is to be displayed in response to the calculated moving distance.

3. The information display device according to claim 1, further comprising:
a magnetic sensor to detect magnetism generated in the direction of each of the three axes of the case;
a second storage control unit to store magnetism resulting from the Earth magnetism detected by the magnetic sensor while the case is in the standstill condition and the posture parameter determined in the standstill condition into the memory;
a second acquiring unit to acquire the magnetism detected by the magnetic sensor;
a second accumulating unit to accumulate each axis component of the magnetism acquired by the second acquiring unit; and
a second correcting unit to correct the posture parameter such that the magnetism accumulated by the second accumulating unit coincides with the magnetism stored in the memory,
wherein the display control unit determines whether the certain information is to be displayed on the display unit based on the posture parameter corrected by the first correcting unit and the second correcting unit.

4. An information display method implemented by an information display device, the information display device comprising: a display unit on which certain information is displayable; a case including the display unit; an acceleration sensor to detect an acceleration generated in a direction of each of three axes of the case, the three axes of the case being orthogonal to each other; and an angular velocity sensor to detect an angular velocity determined relative to each of the orthogonal three axes, and the method comprising:
acquiring the acceleration detected by the acceleration sensor and the angular velocity detected by the angular velocity sensor;
storing acquired angular velocities in a time-series manner;
storing a posture parameter into a memory while the case is in a standstill condition, the posture parameter being determined in the standstill condition and including an acceleration responsive to a gravitational force detected by the acceleration sensor;
updating the posture parameter stored in the memory each time the angular velocity is detected, the posture parameter being updated in response to a value of the acquired angular velocity;
calculating the acceleration responsive to the gravitational force from the detected acceleration based on the posture parameter updated in response to the value of the acquired angular velocity;
accumulating accelerations calculated by the calculating to thereby acquire an accumulated acceleration;
correcting the posture parameter such that the accumulated acceleration coincides with the acceleration responsive to the gravitational force stored in the memory;
calculating a similarity between a time-series pattern of the stored angular velocities and a predetermined time-series pattern of angular velocities; and
determining whether the certain information is to be displayed on the display unit based on the corrected posture parameter and the calculated similarity.

5. The information display method according to claim 4, further comprising:
calculating a moving distance of the case based on the acceleration detected by the acceleration sensor;
determining a range in which the certain information is to be displayed on the display unit in response to the calculated moving distance.

6. The information display method according to claim 4, wherein the information display device further comprises a magnetic sensor to detect magnetism generated in the direction of each of the three axes of the case, and the method further comprises:
storing magnetism resulting from the Earth magnetism detected by the magnetic sensor while the case is in the standstill condition and the posture parameter determined in the standstill condition into the memory;
acquiring the magnetism detected by the magnetic sensor;
accumulating each axis component of the acquired magnetism;
correcting the posture parameter such that the accumulated magnetism coincides with the magnetism stored in the memory; and
determining whether the certain information is to be displayed on the display unit based on the corrected posture parameter.

7. A non-transitory computer-readable storage medium having a program stored thereon that is executable to control a computer of an information display device, the information display device further comprising: a display unit on which certain information is displayable; a case including the display unit; an acceleration sensor to detect an acceleration generated in a direction of each of three axes of the case, the three axes of the case being orthogonal to each other; and an angular velocity sensor to detect an angular velocity determined relative to each of the orthogonal three axes, and the program being executable to control the computer to perform functions comprising:
acquiring the acceleration detected by the acceleration sensor and the angular velocity detected by the angular velocity sensor;
storing acquired angular velocities in a time-series manner;
storing a posture parameter into a memory while the case is in a standstill condition, the posture parameter being determined in the standstill condition and including an acceleration responsive to a gravitational force detected by the acceleration sensor;
updating the posture parameter stored in the memory each time the angular velocity is detected, the posture parameter being updated in response to a value of the acquired angular velocity;
calculating the acceleration responsive to the gravitational force from the detected acceleration based on the posture parameter updated in response to the value of the acquired angular velocity;
accumulating accelerations calculated by the calculating to thereby acquire an accumulated acceleration;
correcting the posture parameter such that the accumulated acceleration coincides with the acceleration responsive to the gravitational force stored in the memory;

calculating a similarity between a time-series pattern of the stored angular velocities and a predetermined time-series pattern of angular velocities; and determining whether the certain information is to be displayed on the display unit based on the corrected posture parameter and the calculated similarity.

8. The non-transitory computer-readable storage medium according to claim 7, wherein the program is executable to control the computer to perform further functions comprising:

calculating a moving distance of the case based on the acceleration detected by the acceleration sensor; and determining a range in which the certain information is to be displayed on the display unit in response to the calculated moving distance.

9. The non-transitory computer-readable storage medium according to claim 7, wherein the information display device further comprises a magnetic sensor to detect magnetism generated in the direction of each of the three orthogonal axes of the case, and the program is executable to control the computer to perform further functions comprising:

storing magnetism resulting from the Earth magnetism detected by the magnetic sensor while the case is in the standstill condition and the posture parameter determined in the standstill condition into the memory;

acquiring the magnetism detected by the magnetic sensor;

accumulating each axis component of the acquired magnetism; and correcting the posture parameter such that the accumulated magnetism coincides with the magnetism stored in the memory, wherein it is determined whether the certain information is to be displayed on the display unit based on the corrected posture parameter.

* * * * *